US008598754B2

(12) United States Patent
Lacour

(10) Patent No.: US 8,598,754 B2
(45) Date of Patent: Dec. 3, 2013

(54) MOTOR WITH ECCENTRIC ROTOR

(75) Inventor: Gilles Lacour, Belley (FR)

(73) Assignee: Delachaux S.A. (FR)

( * ) Notice: Subject to any disclaimer, the term of this patent is extended or adjusted under 35 U.S.C. 154(b) by 205 days.

(21) Appl. No.: 13/055,272

(22) PCT Filed: Jul. 22, 2009

(86) PCT No.: PCT/EP2009/059407
§ 371 (c)(1),
(2), (4) Date: Jan. 25, 2011

(87) PCT Pub. No.: WO2010/010110
PCT Pub. Date: Jan. 28, 2010

(65) Prior Publication Data
US 2011/0121669 A1    May 26, 2011

(30) Foreign Application Priority Data

Jul. 22, 2008 (FR) .................................... 08 54985

(51) Int. Cl.
*H02K 7/06* (2006.01)
(52) U.S. Cl.
USPC ............................................. 310/82; 310/83
(58) Field of Classification Search
USPC ....................... 310/82, 83, 156.01, 68 B, 179
See application file for complete search history.

(56) References Cited

U.S. PATENT DOCUMENTS

| 2,703,370 | A | 3/1955 | Steensen |
| 3,770,997 | A | 11/1973 | Presley |
| 4,914,330 | A * | 4/1990 | Pierrat ............................. 310/82 |
| 5,479,058 | A * | 12/1995 | Seidou ........................ 310/261.1 |
| 5,497,041 | A * | 3/1996 | Kondoh et al. .................. 310/82 |
| 5,672,923 | A | 9/1997 | Jacobsen et al. |
| 6,836,048 | B2 * | 12/2004 | Morimatsu ................... 310/198 |
| 7,663,761 | B2 | 2/2010 | Hacker et al. |
| 2009/0302792 | A1 * | 12/2009 | Osada et al. ............. 318/400.21 |

FOREIGN PATENT DOCUMENTS

| DE | 19923877 A1 | 11/2000 |
| DE | 202006017713 U1 | 2/2007 |
| DE | 10 2006017713 A1 * | 10/2007 |
| EP | 0565746 A1 | 10/1993 |
| JP | 11-178312 A | 7/1999 |

OTHER PUBLICATIONS

Translation for DE 10 20060017713 A1 (Jan. 9, 2013).*
International Search Report, PCT/EP2009/059407, dated Feb. 9, 2010.

* cited by examiner

*Primary Examiner* — Nguyen N Hanh
(74) *Attorney, Agent, or Firm* — Lerner, David, Littenberg, Krumholz & Mentlik, LLP

(57) ABSTRACT

The invention relates to a rotary electric machine with an eccentric rotor that comprises a stator and an eccentric rotor, the stator including a plurality of magnetic poles circumferentially distributed in order to define a closed cylindrical space, the rotor having a generally cylindrical shape with a diameter lower than that of said closed space and including a plurality of magnetic poles circumferentially distributed, the rotor rotating inside the closed space, wherein the machine further includes a shaft depending on the rotational component of the rotor, said machine being characterized in that, at the area of electromagnetic interaction between the stator and the rotor, the evolute of a stator pole and the evolute of a rotor pole have substantially equal lengths.

12 Claims, 17 Drawing Sheets

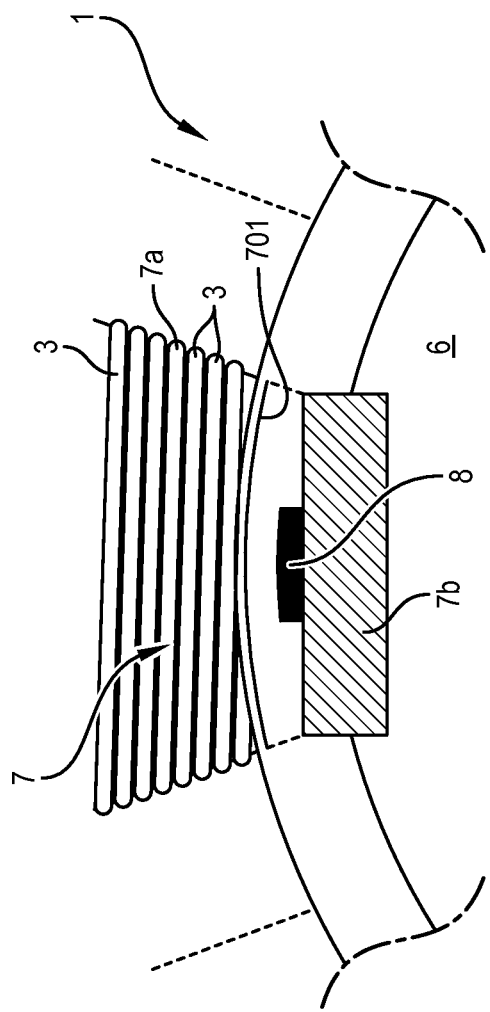

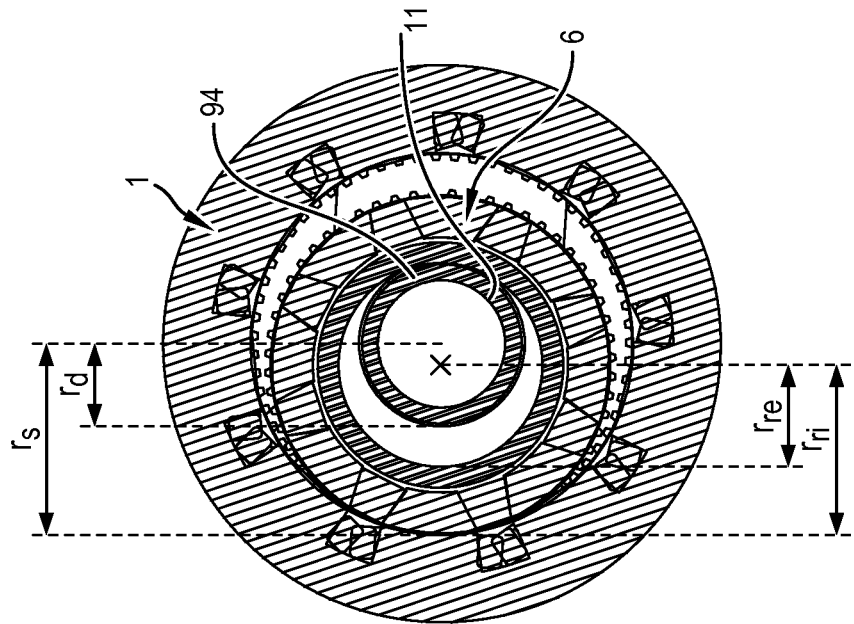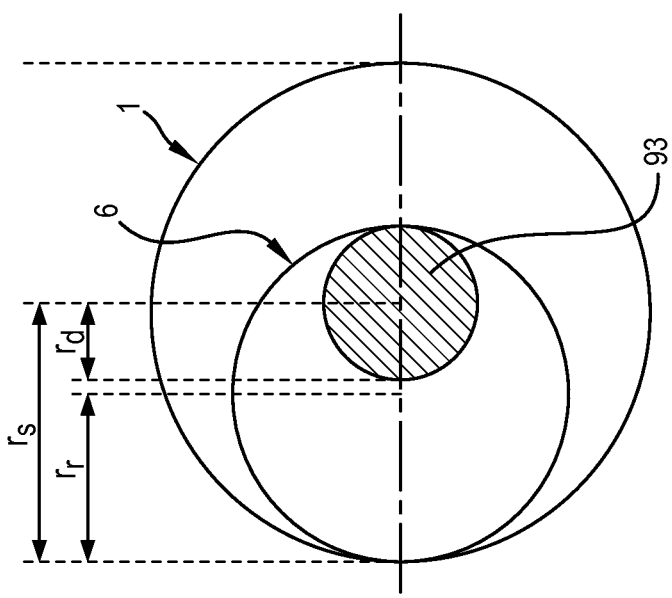

MOTOR WITH ECCENTRIC ROTOR

CROSS-REFERENCE TO RELATED APPLICATIONS

Figure 1:
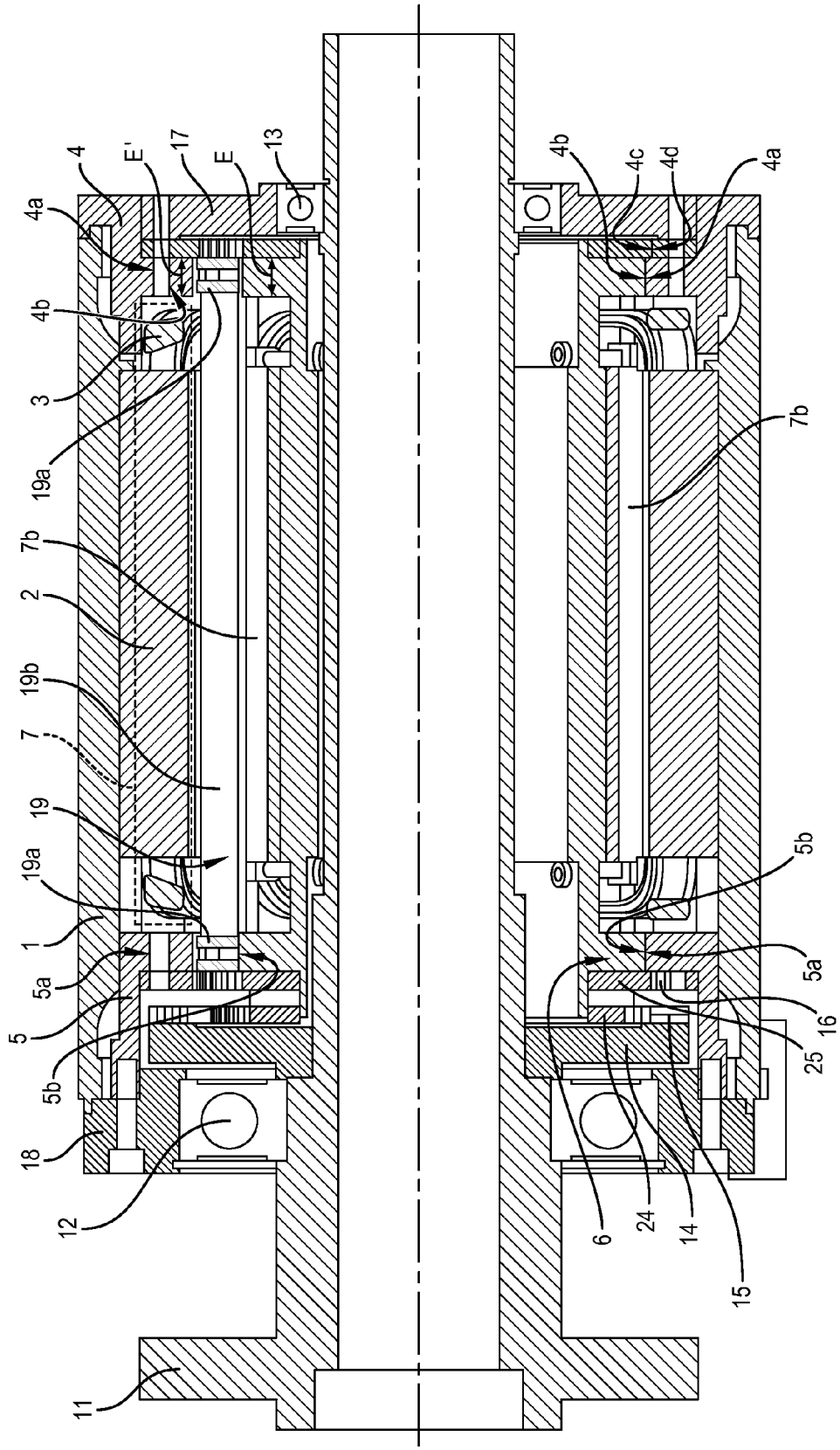

The present application is a national phase entry under 35 U.S.C. §371 of the International Application No. PCT/EP2009/059407, filed on Jul. 22, 2009, published in French, which claims the benefit of French Patent Application No. 0854985, filed on Jul. 22, 2008, the entire disclosures of which applications are hereby incorporated herein by reference.

The invention relates to rotary electric machines with an eccentric rotor.

In the field of brushless electric motors, some were developed with an eccentric rotor.

The electromagnetic energy generated on the stator by the powering of the electric motor is transmitted without contact to the rotor. The speed of the motor is generally controlled by the frequency of the power supply of the motor.

In the case of a motor with an eccentric rotor, the main axis of the rotor is either allowed to circulate freely in the hollow defined by the stator, or is arranged in such a way that it defines a circular trajectory inside of the hollow defined by the stator (so-called "satellite holder" arrangement). Generally, the rotor comprises means intended to rotate it inside the hollow of the stator. As such, a successive powering of the coils of the stator around the hollow provokes an attraction of the rotor provided either with poles defined by an arrangement of permanent magnets, or with electromagnets.

The advantages in using an eccentric rotor can be as follows:

The motor generally uses less coils than a conventional electric motor. This then implies a reduction in the production and maintenance costs of the motor.

The rotating of the rotor within the hollow of the stator is provoked by the magnetic attraction force of the coils of the stator on the poles of the rotor and this attraction increases as the radius of the rotor becomes closer to the radius of the closed circuit of the stator. As the rotation of the rotor comes from a magnetic attraction force, this makes it possible to increase the power transmitted to the rotor.

The rotating of the rotor within the stator provokes an intrinsic reduction of the rotating speed of the rotor around its axis (in absolute value) in relation to the rotating speed of the electromagnetic energy around the stator. Indeed, a calculation using the Willis formula gives a ratio r between the rotating speed of the rotor around its main axis and the rotating speed of the electromagnetic energy of the stator (speed at which the successive powering of the poles defines a full turn around the hollow of the stator), r being equal to the following ratio:

$$r = \frac{nr - ns}{nr}$$

with:
nr=number of poles of the rotor; and
ns=number of poles of the stator;

In a common case where the number of poles of the rotor is close to the number of poles of the stator, for example, ns=nr+1, there is then a speed reducing ratio equal to:

$$\frac{-1}{nr}$$

As such it is possible, in applications with reduced rotating speed, to not need a reducing gear (with the associated losses).

In addition, this ratio is transferred directly on the torque. Indeed, the electromagnetic power transmitted to the rotor (less the losses) being equal to the mechanical torque multiplied by the rotating speed of the rotor, a substantial decrease of the rotating speed results in a substantial increase of the torque.

Generally, the motors are as such selected with an eccentric rotor for uses with slow rotation but with substantial and regular torque.

EP 0 565 746 describes a motor with an eccentric rotor comprising at the stator a plurality of electromagnets arranged in a network to form a closed space, each electromagnet (pole) being positioned in series with the other poles in order to define a closed pathway, the rotor being comprised of a permanent magnet, a pole which is arranged is such a way as to rotate along the closed pathway, and means for selectively energising the electromagnets in order to attract and/or repel the permanent magnet of the rotor in order to rotate the later.

JP 11 178 312 describes a motor with an eccentric rotor comprising a stator with a plurality of electromagnets arranged along a closed pathway defining a hollow such as described previously.

The motor further comprises a rotor comprising a plurality of magnets, for example, permanent, such that the rotor rotates along the closed pathway of the stator on these poles of permanent magnets according to the successive powering of the electromagnets of the stator.

From a mechanical standpoint, the rotor and the stator can include rolling tracks, in such a way that the rolling contact between the rotor and the stator is carried out on said rolling tracks.

The rotor and the stator can further comprise means for meshing in order to guarantee a non-slip rotation of the rotor, i.e. the relative speed at the point of contact between the stator and the rotor is continuously zero.

In order to transmit the rotation of the rotor on an output constituted of a non-eccentric rotating shaft, a transmission via pins can be provided, the pins being integral with the output shaft and being driven by an element mounted coaxially with the stator and integral with the rotor in such a way that these pins placed in corresponding holes are driven, driving the output shaft in rotation.

A purpose of the invention is to propose an improved motor with an eccentric rotor in relation to prior art.

To this effect, the invention proposes a rotary electric machine with an eccentric rotor comprising a stator and an eccentric rotor, the stator comprising a plurality of magnetic poles distributed circumferentially in order to define a closed cylindrical space, the rotor being of a generally cylindrical shape with a diameter less than that of said closed space and comprising a plurality of magnetic poles distributed circumferentially, the rotor rotating inside the closed space, the machine further comprising a shaft depending on the rotational component of the rotor, machine characterised in that, on the area of electromagnetic interaction between the stator and the rotor, the evolute of a stator pole and the evolute of a rotor pole are of substantially equal lengths.

Advantageously, but optionally the invention comprises at least one of the following characteristics:

the stator comprises a rolling track wherein a rolling track of the rotor is able to rotate, the stator comprises at least one rolling track wherein a rolling track of the rotor is able to rotate, the rolling tracks having a complementary profile able to create an axial counter-reaction force, the poles of the stator include windings, and furthermore means for controlling the power supply of the windings according to position information of the rotor, said position information of the rotor is provided by an angular sensor, the machine further comprises a device for meshing between the rotor and the stator in order to guarantee a non-slip rotation of the rotor in the stator, the shaft is subject to the rotor by a drive pin transmission system cooperating with holes of a size greater than the section of the pins, said holes each include a device for mechanical bearing, each driving pin comprises an adherence surface comprising a joint, on a bearing surface whereon the corresponding mechanical bearing bears against, the shaft is subject to the rotor by a twin-gear transmission system, the machine further comprises a counterweight forming with the rotor a unit of which the centre of gravity is located in the vicinity of the axis of the stator, the counterweight is in the shape of a moon crescent, the stator has an even number of poles and of which the direction of the windings of the stator are inverted between two successive poles, and all connected in series, the stator has one pole more than the rotor, the rotor is crossed longitudinally by a bore; it is crossed by a hollow shaft of which the outside diameter is less than the diameter of the bore less the difference between the diameters of the stator and of the rotor.

Figure 2:
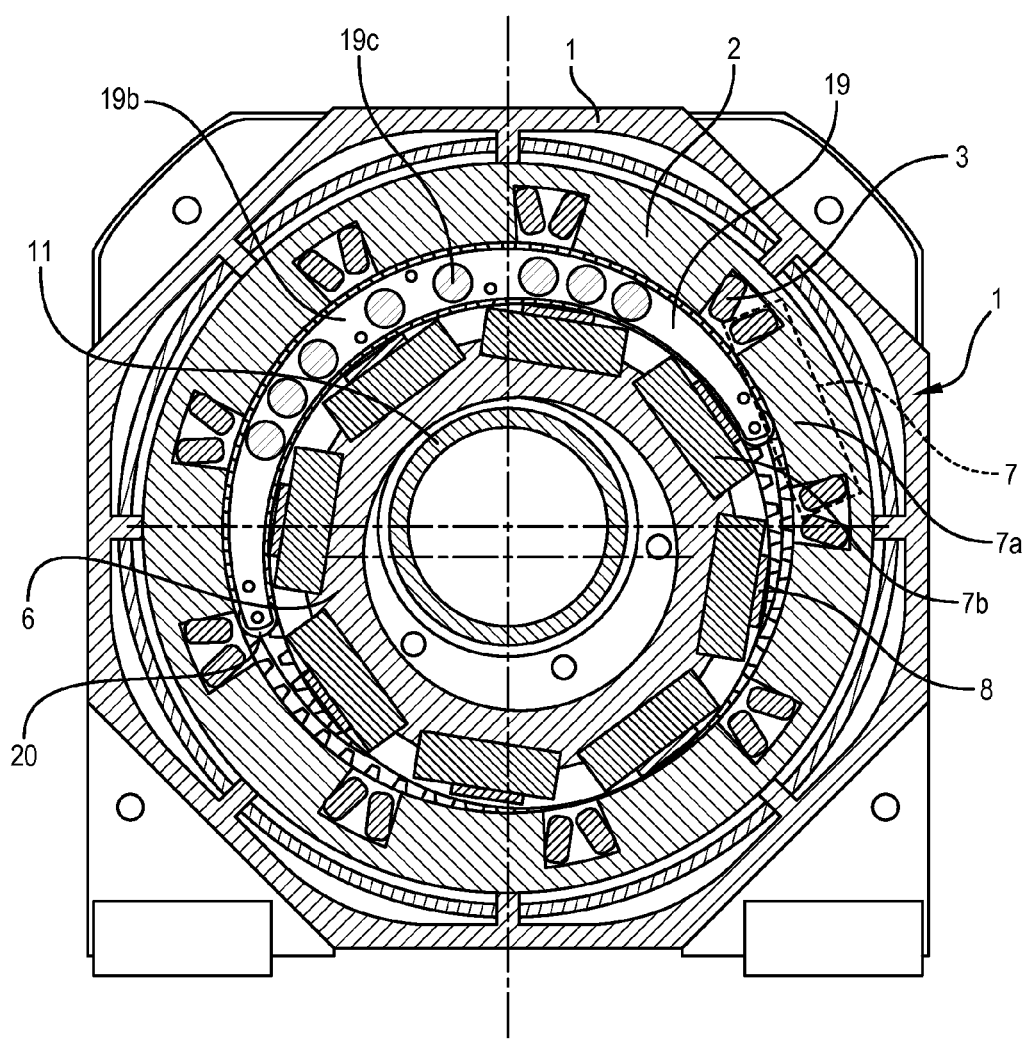
Figure 3:
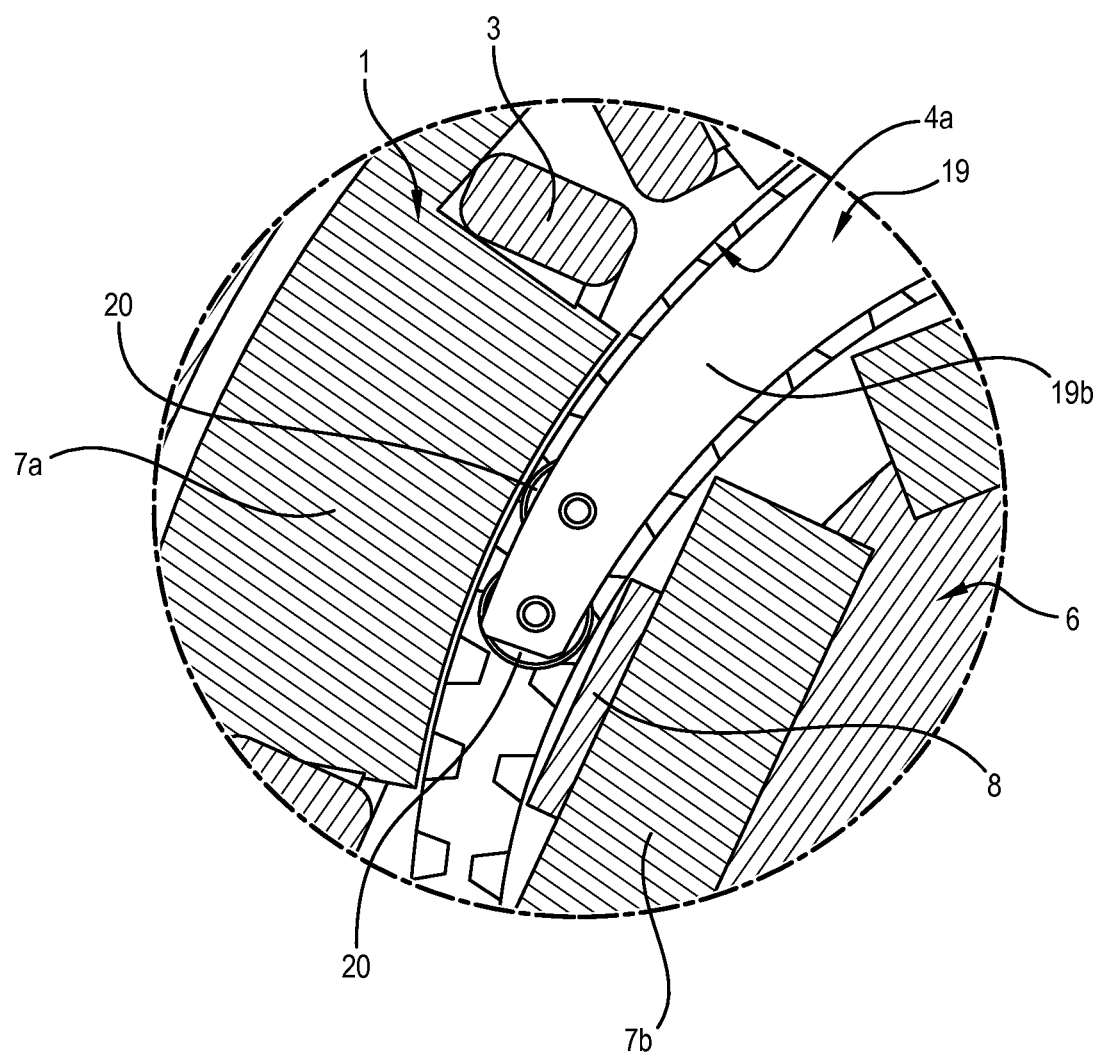
Figure 4:
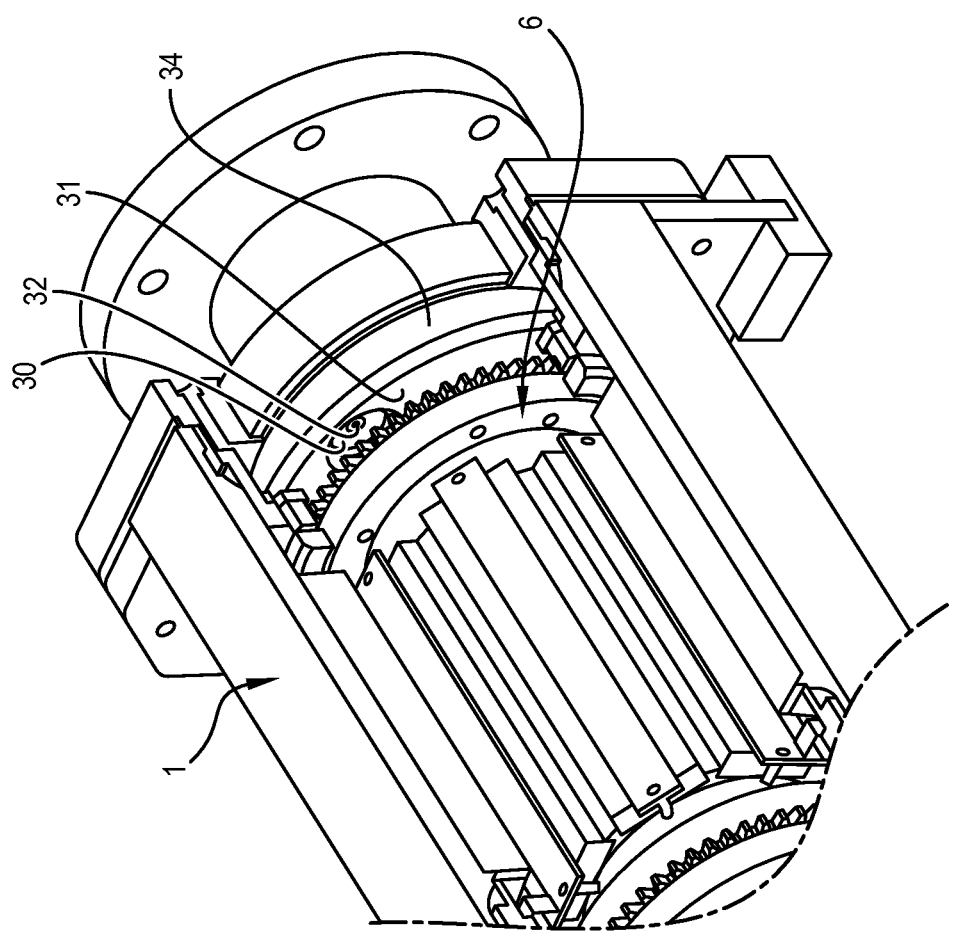
Figure 5:
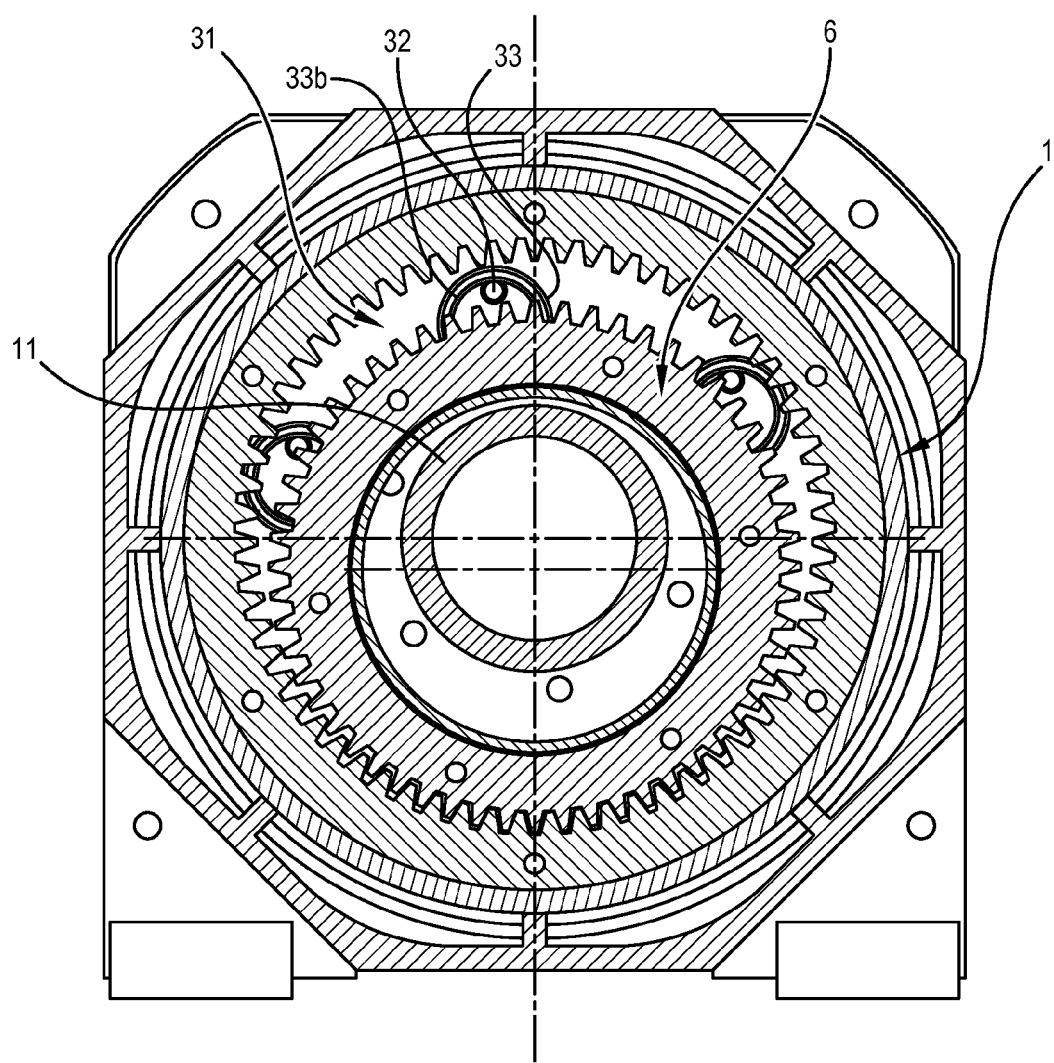
Figure 6:
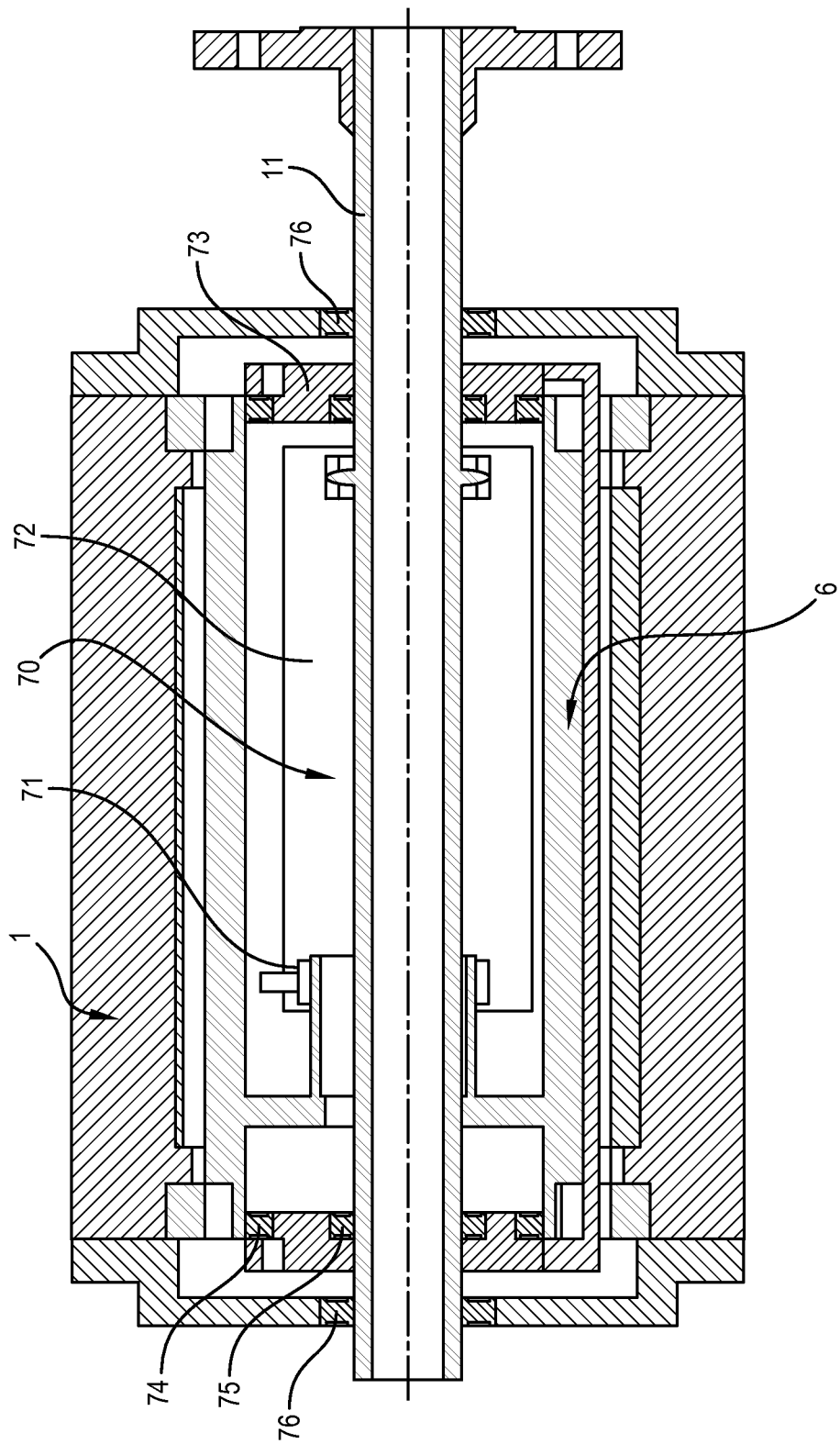
Figure 7:
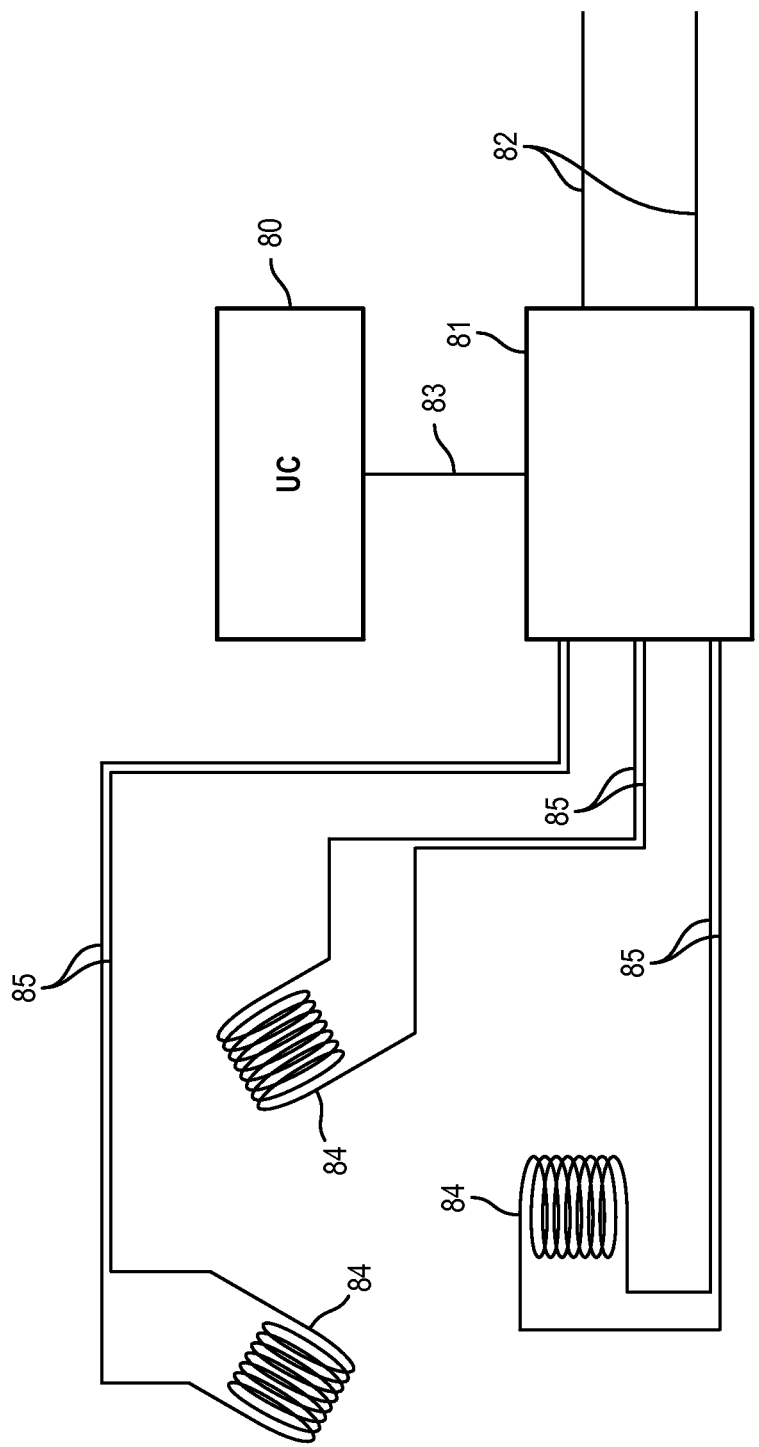
Figure 8:
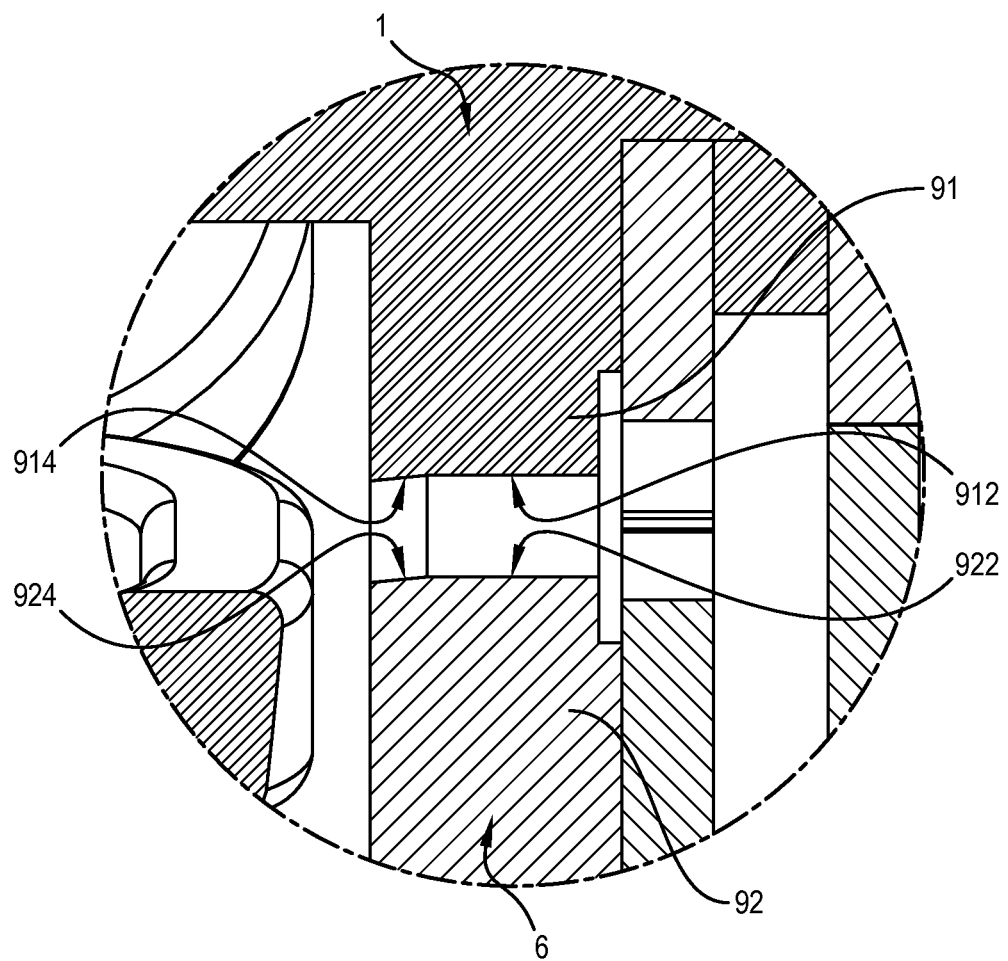
Figure 10A:
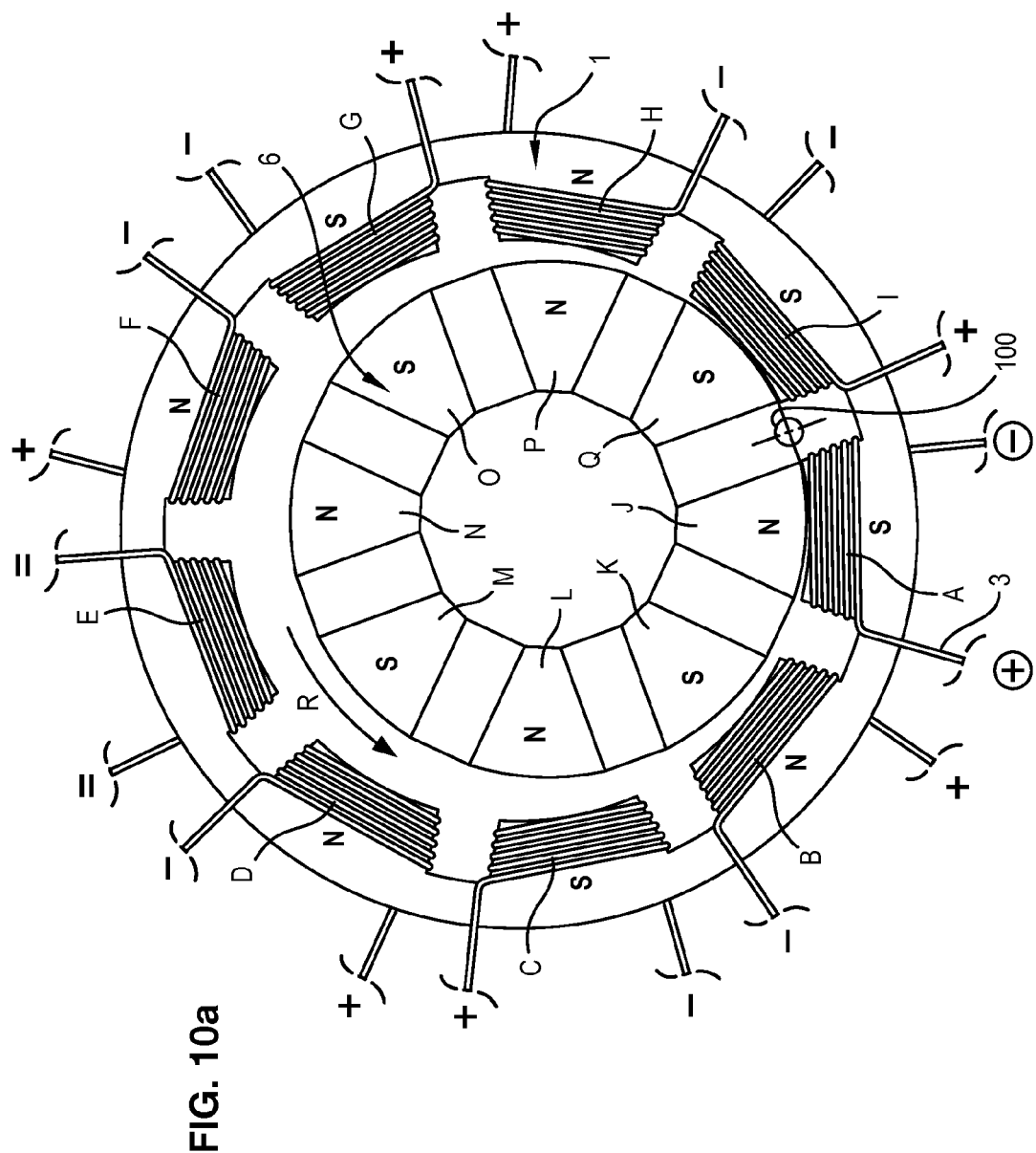
Figure 10B:
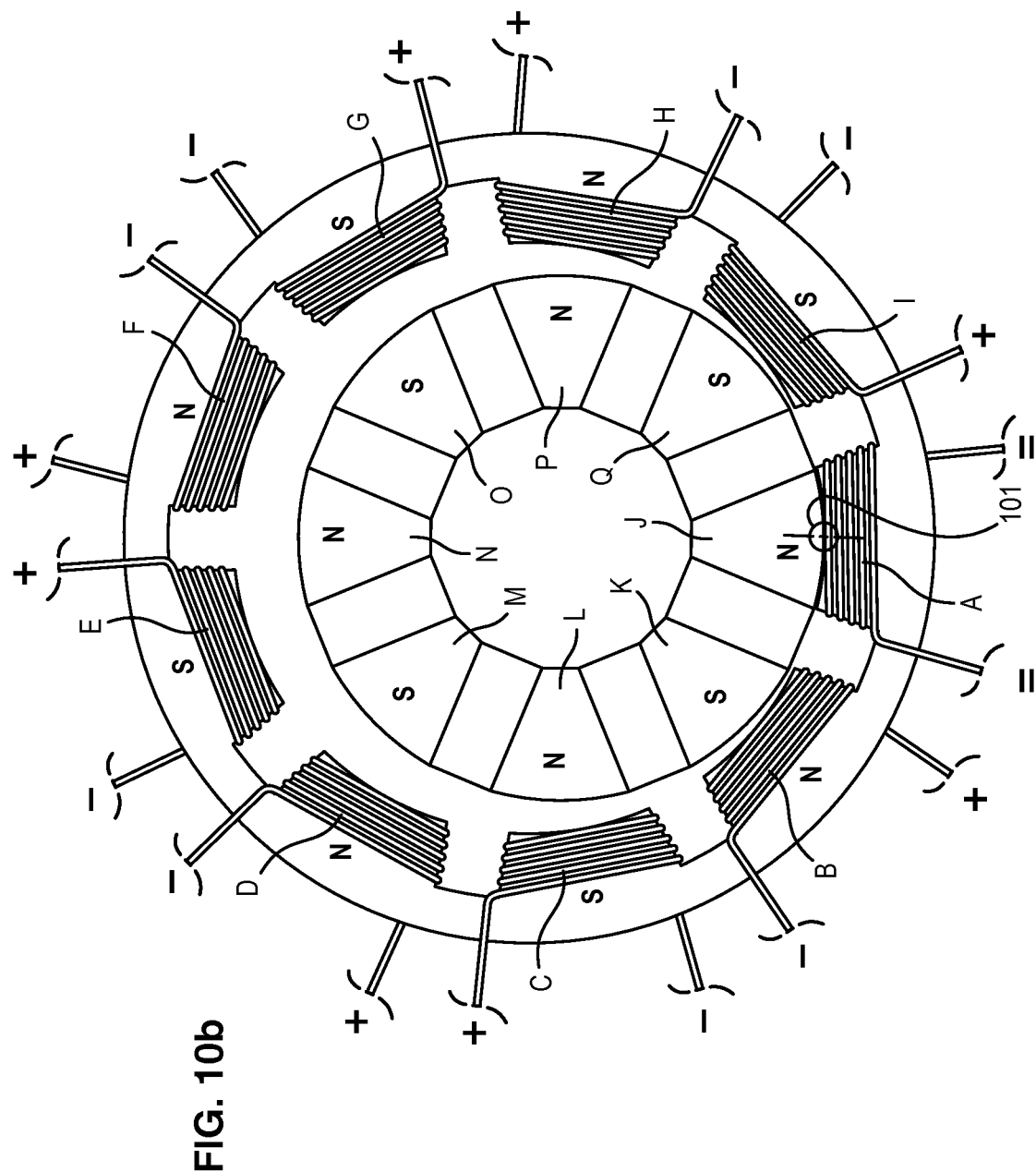
Figure 10C:
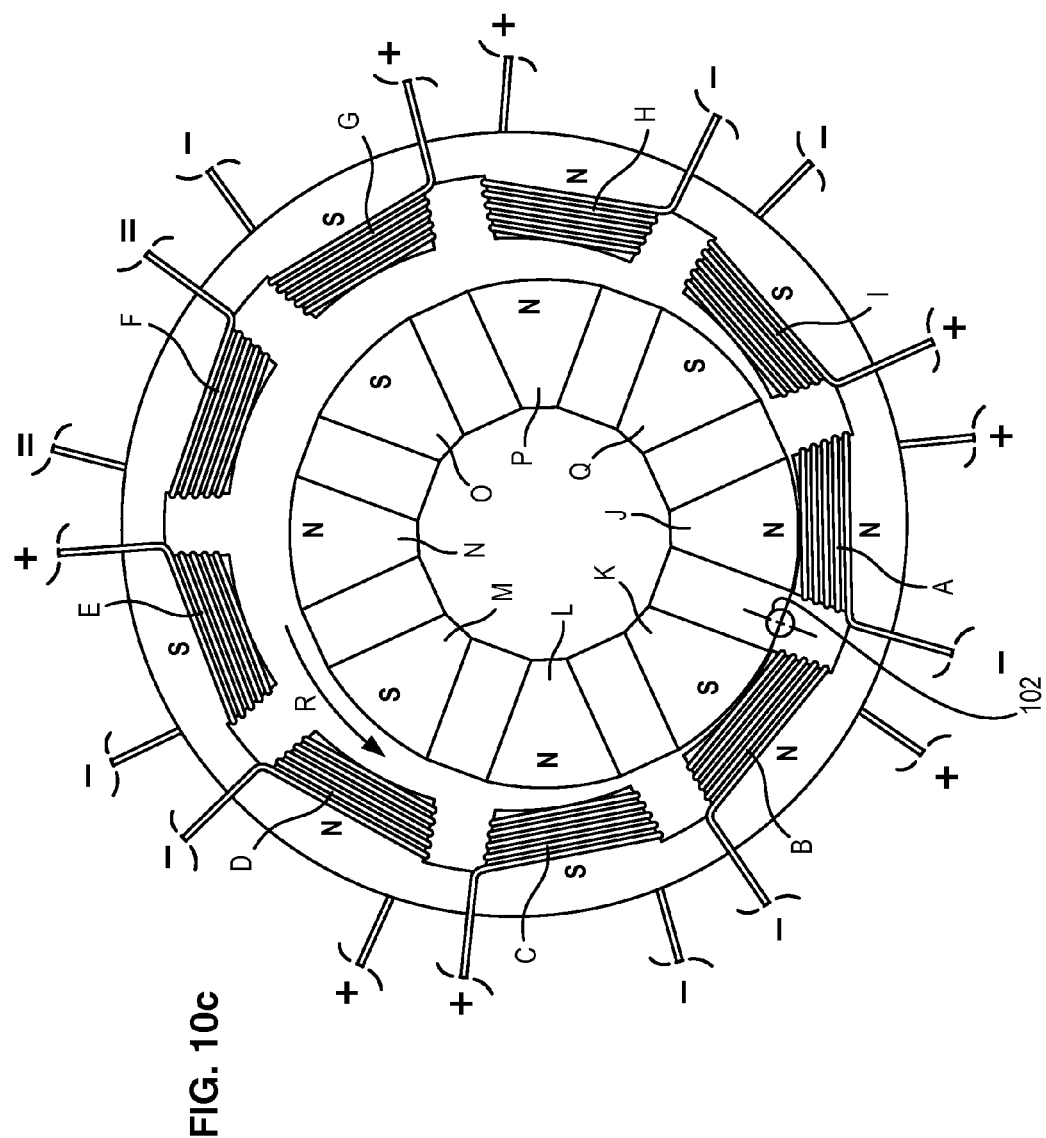
Figure 11A:
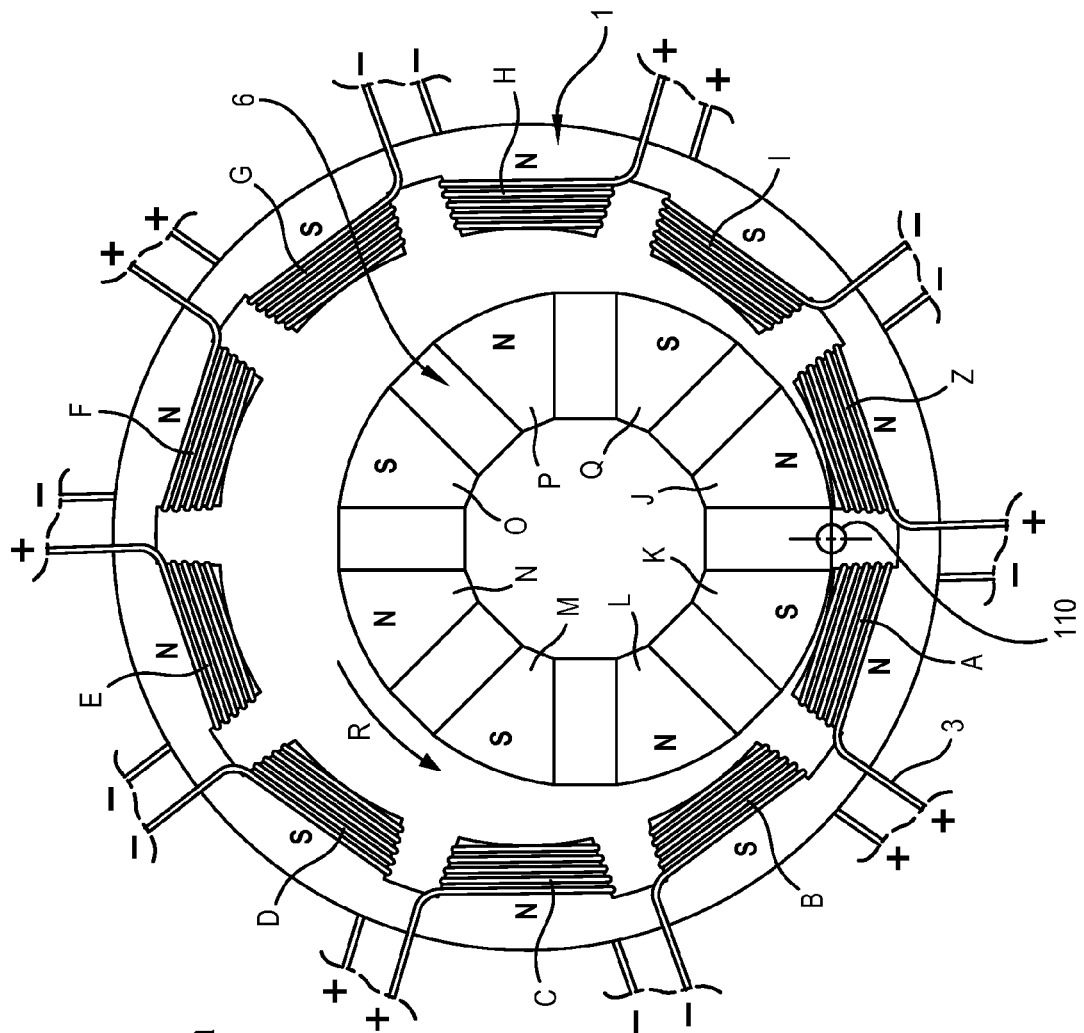
Figure 11B:
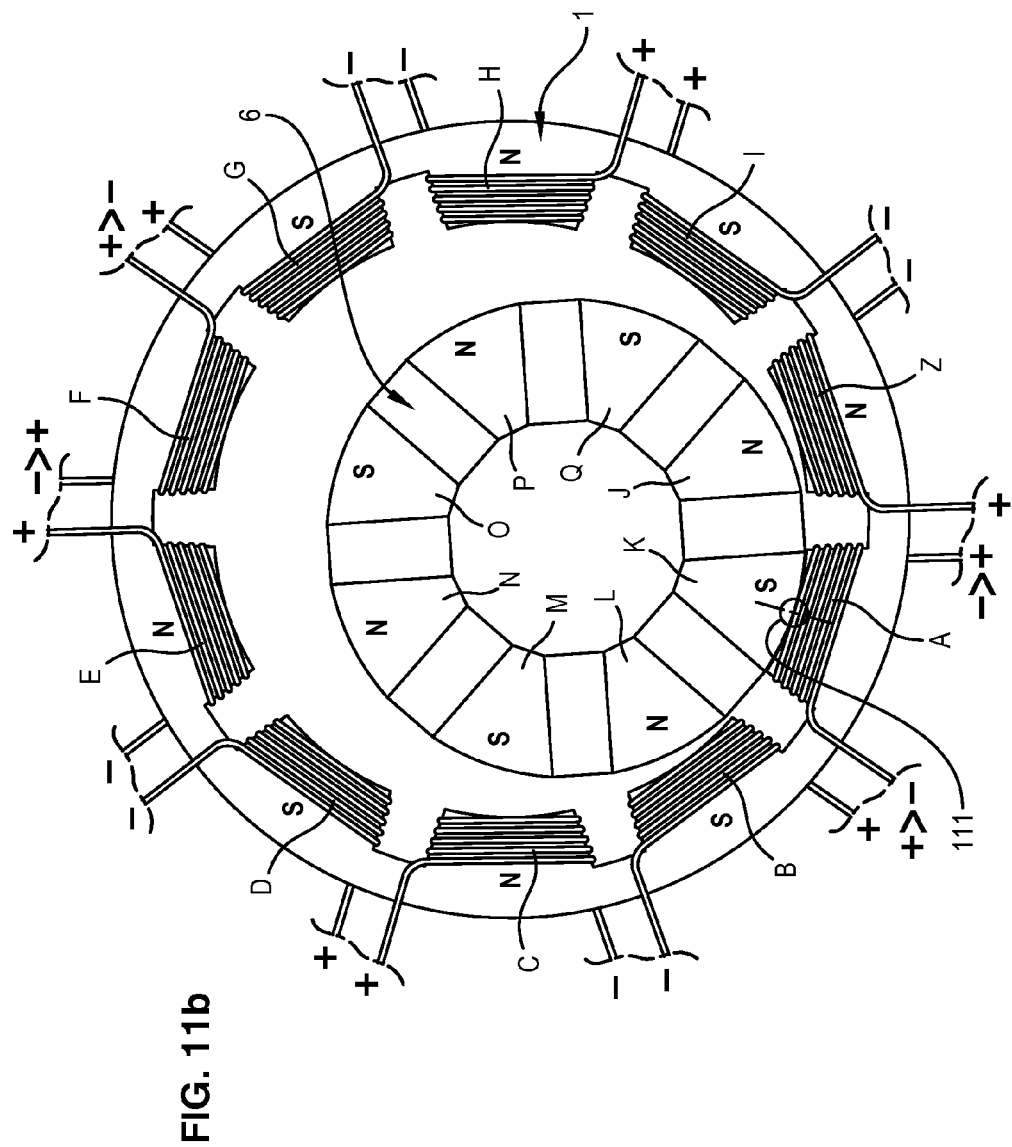
Figure 11C:
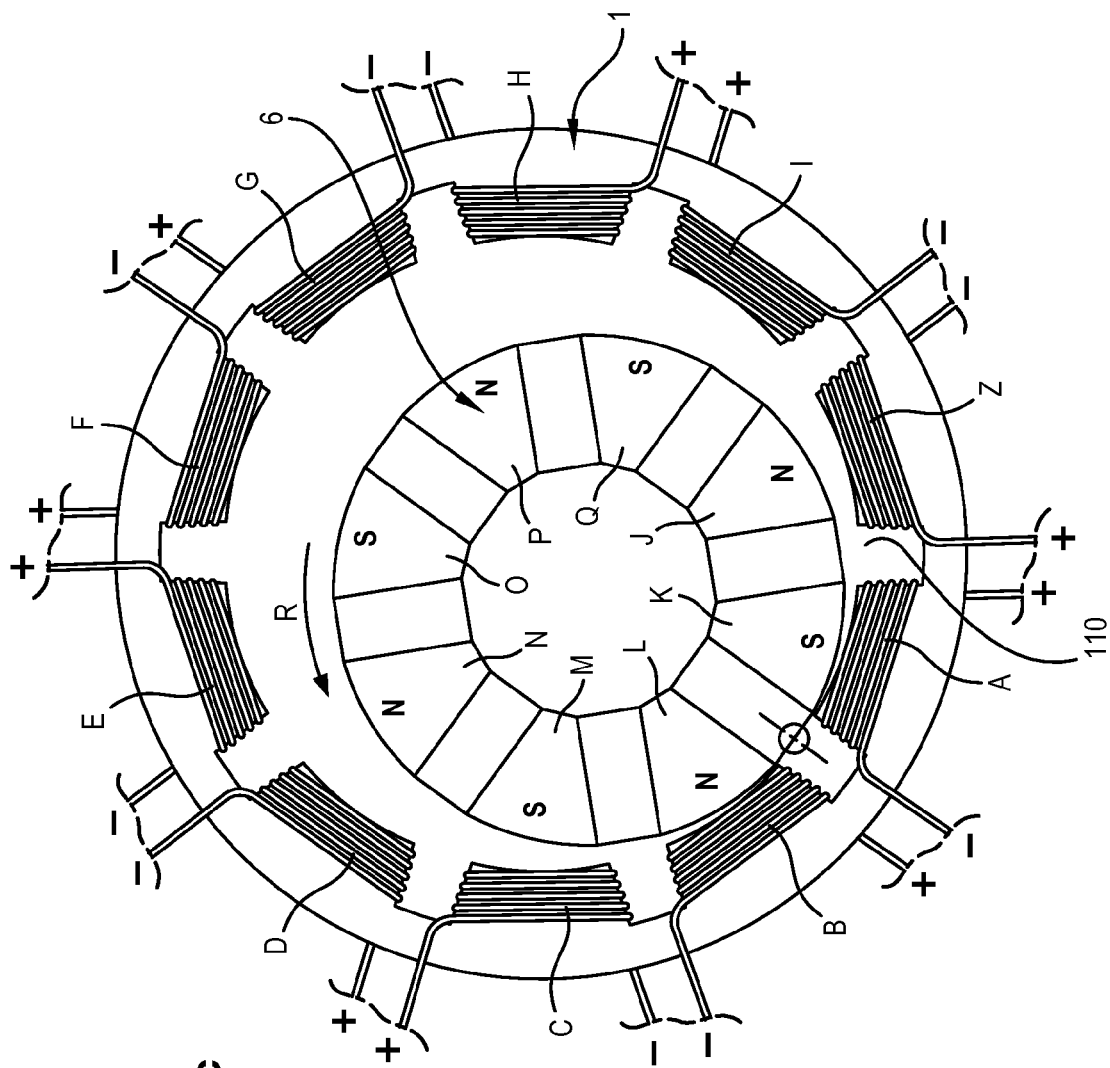
Figure 12:
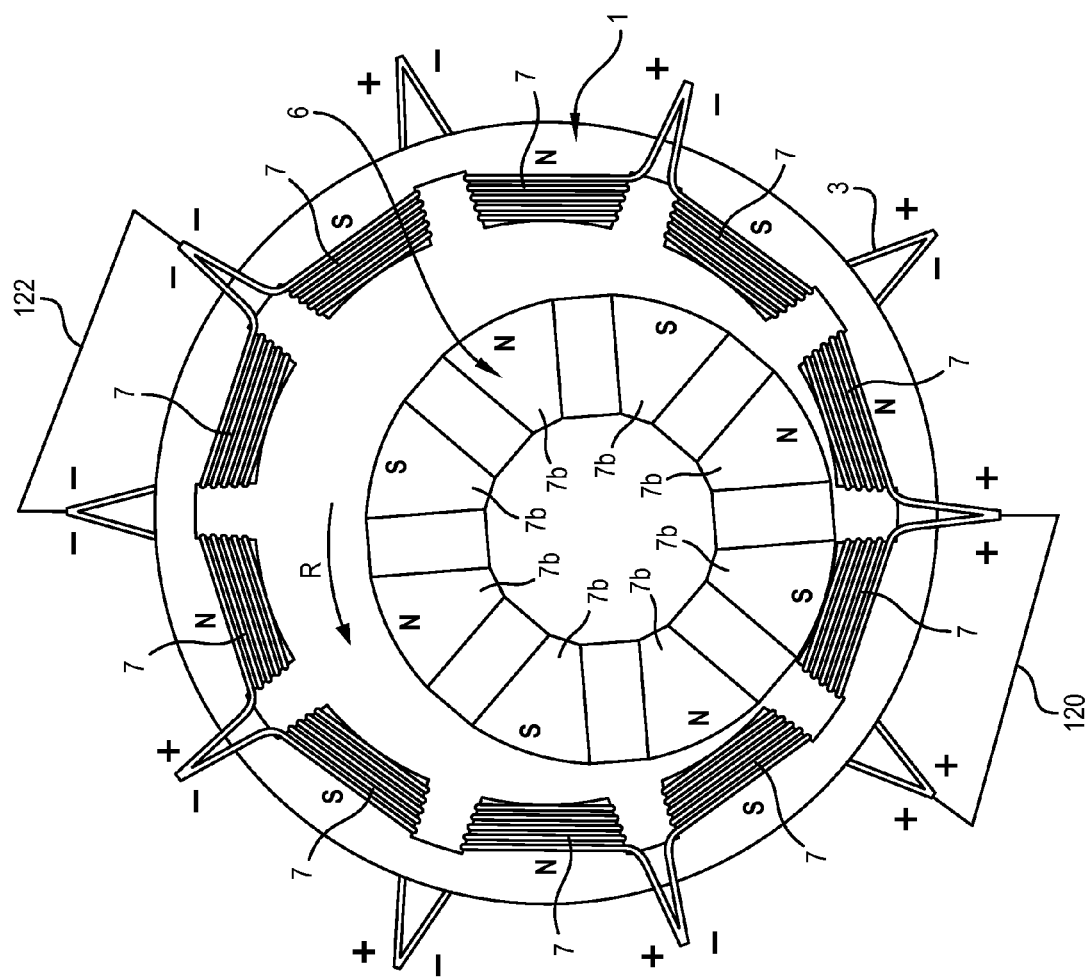

Other characteristics, purposes and advantages of this invention shall appear when reading the following detailed description, with regard to the annexed drawings, provided by way of a non-restrictive example and wherein:

FIG. 1 is a longitudinal cross-section of a motor with an eccentric rotor according to an embodiment of the invention, FIG. 2 is a transversal cross-section of the motor in FIG. 1, FIG. 2b diagrammatically shows a pole of the rotor as well as a pole of the stator, FIG. 3 is a detailed view of a counterweight of a motor with an eccentric rotor according to an embodiment of the invention, FIG. 4 shows a cavalier perspective of the motor in FIGS. 1 and 2, FIG. 5 is a transversal cross-section of a motor with an eccentric rotor according to an embodiment of the invention, FIG. 6 is a longitudinal cross-section of a motor with an eccentric rotor according to an embodiment of the invention, FIG. 7 is a block diagram of the means of controlling a motor with an eccentric rotor according to an embodiment of the invention, FIG. 8 is a detailed cross-section of the rolling tracks of a motor with an eccentric rotor according to an embodiment of the invention, FIGS. 9a and 9b are simplified transversal sections of a motor with an eccentric rotor according to an embodiment of the invention, FIGS. 10a to 10c are simplified transversal sections of a motor with eccentric rotors according to an embodiment of the invention, the stator comprising an odd number of poles, FIGS. 11a to 11c are simplified transversal sections of a motor with eccentric rotors according to an embodiment of the invention, the stator comprising an even number of poles, FIG. 12 is a simplified transversal cross-section of a motor with eccentric rotors according to an embodiment of the invention, the stator comprising an even number of poles.

In reference to FIGS. 1 and 2, a motor with an eccentric rotor according to an embodiment of the invention comprises a stator base 1 having advantageously blades for the ventilation and the cooling of the motor; the stator further comprises a carcass 2, preferentially made of soft steel; the stator further comprises electromagnets 7 comprised of radial extensions 7a of the carcass 2 and of a winding 3 wound radially around extensions 7a, in such a way that the power supply of the winding 3 generates a magnetic field borne by the extensions 7a (a lamination and a rolling of these extensions is moreover provided in order to limit the iron losses of the motor, i.e. the losses via hysteresis and by eddy current). Of course, the magnetic field of the motor can be generated by any other solution from prior art, such as an axial winding. The poles of the stator are located radially around a hollow or cavity of circular section. The stator further comprises rolling tracks 4a and 5a on either side of the longitudinal axis of the stator, borne by flanges 4 and 5 embedded into the base of the stator 1. The motor further comprises a rotor 6 of a diameter that is less than the diameter of the cavity of the stator, which comprises two rolling tracks 4b and 5b of which the width E is substantially equal to the width E' of the rolling tracks of the stator 4a and 5a and which are substantially aligned respectively on the rolling tracks of the stator 4a and 5a. The rotor comprises fixed magnets 7b distributed radially around its periphery. Advantageously, these magnets are permanent magnets; their number is less than that of the poles of the stator; their number is preferentially even and they are distributed in such a way that a south pole is placed between two North poles. Preferentially, the stator comprises a number of poles between 3 and 21 and the rotor comprises a number of poles between 2 and 20. Note that the fact of using 3 poles at the stator (or any multiple of 3) makes it possible to directly use a three-phase power supply for the powering of the machine with eccentric rotor, allowing for a reduction in the manufacturing and maintenance costs. In addition, in order to carry out a variation of frequency in the power, it suffices to use a three-phase frequency variator available in commerce, often at low cost, which reduces the manufacturing and maintenance costs.

As described above, the successive powering of the electromagnets of the stator attracts, according to their polarity, the permanent magnets of the rotor, as such forcing the rotor to rotate on rolling tracks.

The control of the power of the windings of the stator is such that the torque generated by the attraction of the magnets of the rotor is substantially constant. To this effect, a device for controlling the power supply of the windings is provided which can include a sensor of the angular position of the rotor.

The motor comprises an output shaft 11 advantageously hollow in order to allow for the possible passing of a cable, of a pipe or of another shaft bearing another movement. This hollow further makes it possible to decrease the inertia of the output shaft. This output shaft is mounted in rotation in relation to the stator thanks to bearings 12 and 13, mounted on bearing holders 17 and 18, which are in turn connected to the flanges 4 and 5. The output shaft extends through the cavity of the stator in the axial direction and the rotor circulates around the output shaft. The transformation of the rolling of the rotor into rotation of the output shaft 11 is carried out using a twin-gear system. This system comprises, on the stator, a gear 16 which is a fixed gear integral with the flange 5 and of which the number of teeth is denoted $Z_{16}$. This gear drives a gear 25 integral with the rotor 6 and meshing with the gear 16. The gear 25 comprises $Z_{25}$ teeth. The rotor comprises a second terminal gear 24 integral with the rotor and comprising $Z_{24}$ teeth. The outside terminal gear 24 meshes with a gear 15 integral with the output shaft 11 by being fixed to it through a support 14 integral with the output shaft 11. The rotating speed of the output shaft 11 is linked to the rotating speed of the rotor 6 by the ratio $r_2$ between the rotating speed of the shaft 11 and the rotating speed of the rotor:

$$r_2 = \frac{Z_{25} * Z_{24}}{Z_{16} * Z_{15}}$$

So the ratio $r_3$ between the rotating speed of the output shaft and the angular speed of the alimentation of the stator is:

$$r_3 = \frac{Z_{25} Z_{24}}{Z_{16} Z_{15}} \times \frac{1}{ns}$$

A gear 4c integral with the rotor 6 and a gear 4d integral with the output shaft 11 are furthermore provided, with the meshing between the gears 4c and 4d making it possible to guarantee a non-slip rotation of the rotor in relation to the stator on rolling tracks thus making it possible to guarantee the alignment of the poles.

Of course, the eccentric displacement of the rotor provokes a substantial unbalance which itself can provoke vibrations of the motor. In order to compensate for this unbalance, according to an embodiment of the invention, the insertion between the rotor and the stator of a counterweight 19 is provided. Advantageously, the counterweight 19 has a shape in the form of a moon crescent (or half-moon) which, on its inner side, hugs the periphery of the rotor and, on its outer side, hugs the periphery of the stator. The counterweight comprises a body 19b and two portions of ends 19a, preferentially located on rolling tracks 4a and 5a. Advantageously, the counterweight comprises recesses 19c intended to adjust its weight for example by filling them or not filling them with a filler material. Note that the counterweight 19 is flushed by the rotation of the rotor and rotates along the closed pathway of the stator in the direction opposite the rotation of the rotor, and has in this effect two series of rollers 20, one for its rotation on the stator and the other for its rotation on the rotor. Also note that such a counterweight has no fixed physical link with the rest of the machine, which makes it possible for the output shaft to extend transversally from one end to the other of the stator.

In reference to FIG. 3 showing more precisely an end 19b of the counterweight 19, this end comprises a pair of rollers 20 rolling respectively on the stator and on the rotor, along rolling tracks 4a and 5a. As such, the rotating of the rotor along the closed pathway of the stator has a tendency to repel the counterweight by acting on the roller in contact with it, with the latter being flushed by rolling on the stator via the other roller.

The rotor 6/counterweight 19 unit has together balanced masses, with a centre of gravity located substantially on the main axis of the stator.

Returning to FIG. 2, note that on the area of magnetic interaction between the poles of the rotor and the poles of the stator, the evolute of the poles of the rotor 7b and the evolute of the poles of the stator 7a along their respective circumferences substantially have the same length. In reference to FIG. 2b, it is denoted that the pole of the rotor is not curvilinear. Indeed, the pole of the rotor comprises a permanent magnet 7b of generally rectangular section fixed to the rotor by a tie plate 8 and is protruding in relation to the carcass of the rotor. In this case, it is observed that the circumferential evolute 701 of the pole 7b of the rotor is substantially the same length as the circumferential evolute of the pole of the stator.

The poles remain face-to-face during the movement of eccentric rotation. The alternation of the current in the windings provokes the rotation of the rotor on itself and around the output shaft 11.

This configuration of the evolutes of the poles has several advantages. In particular, the magnetic coupling between rotor and stator is optimised, and the tangential components of the forces in play, able to slide the rotor in relation to the stator are minimised. The torque is substantially constant without having recourse to elaborated pole shapes as in variable reluctance motors or to a large number of poles as in high-torque induction motors.

Furthermore, having evolutes substantially of the same length makes it possible to not be restricted to a single geometric shape of the poles. As such the poles are not necessarily cylindrical, as in FIG. 2b wherein the poles of the rotor are geometrically rectangular.

In reference to FIGS. 4 and 5, the transmission of the rotation of the rotor on the output shaft 11 is carried out using a series (preferentially six) of driving pins 32. To this effect, the rotor comprises a drive plate comprising a corresponding series of holes 30, each hole being preferentially of cylindrical shape, and comprising a support bearing 33. This bearing makes it possible to cancel the friction of the pin on the outside edge of the bore of the hole, thus avoiding a wear of the pin. Advantageously, each bearing pin 32 exteriorly comprises on an adherence surface a joint (preferentially an O-ring inserted into a circumferential groove of the pin) of adherence 33b allowing the pin to have better adhesion on the point of contact with the support bearing. The use of a joint also makes it possible to add a damping function thus avoiding the mechanical impacts between the driving pin and the support bearing (these mechanical impacts can indeed lead to a deterioration of the device). Note that such a joint makes it possible to avoid small sliding between the pin and the support bearing; as such preventing deterioration via friction (fretting corrosion).

The output shaft 11 is integral with a pin holder 34 comprising the driving pins 32. The pin holder 34 and the drive plate 31 are arranged in such a way that each pin 32 of the pin holder 34 is located inside a corresponding hole of the drive plate 31. Inversely, the pin holder can also be arranged in such a way as to be integral with the rotor and the drive plate integral with the output shaft.

The rotation of the rotor drives in rotation the plate 31 and the holes 30, which in turn drive the pins 32 and the pin holder 34, which provokes the rotation of the output shaft 11. The axis of the rotor 6 is displaced during its rolling, the holes are designed in such a way as to allow for the corresponding movement of the pins in their place; more precisely, note that not only is each pin of a diameter less than the diameter of the corresponding hole but in addition that the difference between the diameter of the pin and the diameter of the hole corresponds to the difference in diameter between the rotor and the stator due to eccentricity. Further note that, in order to avoid the hyperstaticity due to the interaction of the series of pins with the holes that the difference between the diameter of the pin and the diameter of the hole is slightly greater than the difference in diameter between the rotor and the stator due to the eccentricity.

The support bearing 33, as well as the O-ring joint 33b, have for function to allow for a better engagement with each driving pin 32.

In reference to FIG. 6, a cardan joint system 70 is provided for the transmission of the rotation of the rotor 6 to the output shaft 11. To this effect, a link 71 of the cardan joint 70 on the rotor is provided. The cardan joint comprising a shaft 72 and driving in rotation the shaft 11 by the intermediary of a link 71.

Advantageously, it is provided to provide the motor with eccentric bearing holder 73 in order to guarantee an independent rotation between the rotor, in eccentric rotation in relation to the stator and the output shaft 11 using bearings 75 (bearings supporting the output shaft 11) and the bearings 74 (bearings supporting the rotor). As such the combination of the eccentric bearing holders 73, and bearings 74, 75 make it possible for the rotor to have an eccentric movement around the output shaft 11 without disturbing the rotation of the shaft. The shaft is a pivot connection in relation to stator 1 thanks to the bearings 76.

In reference to FIG. 7, the controlling of the electrical power supply of the stator windings is carried by a control unit 80 composed for example of a processor, of a working memory and of a plurality of inputs/outputs (analogue and/or digital). Advantageously, this control unit is a microcontroller or a computer comprising an appropriate input/output extension (board, peripheral device, etc.).

The control outputs of the unit 80 are transmitted to a switching unit 81. This switching unit 81 is connected to the windings 84 (here numbering three) by the power supply leads 85, and also connected to a source of power 82. The switching unit 81 can be arranged on the motor or outside the motor. The power supply 82 can be direct or alternating of the single-phase or multi-phase (preferentially three-phase) type, with a voltage typically preferentially between 50 and 400 Volts.

Advantageously, the switching unit 81 comprises means for rectifying if the source of power 82 is alternating, means of smoothing and regulating the voltage and controlled switches, preferentially transistors and more particularly transistors of the IGBT type.

Several strategies for controlling the power supply of the windings 84 can be provided.

A first strategy consists in managing the power supply of the windings using one or several sensor(s) arranged(s) on the rotor, in order to know its position.

Another strategy consists in measuring the current circulating in the windings and by analysing the current/voltage ratio, in determining which winding correspond to the approach of a magnet of the rotor on this winding. As such, it is possible to reliably know the position of the rotor within the stator. It is then possible to operate the motor in torque control mode.

Concerning the power supply of the electromagnets, various solutions can be considered. They have in common to power the windings differently on either side of the point of contact (or nip line) between the rotor and the stator. Note that the term "point of contact" does not necessarily designate a point of physical contact between the rotor and the stator. In particular, in the case where the stator and the rotor are in physical contact only on rolling tracks (which guarantees the conservation of the materials on the poles), the term "point of contact" concerns the point at which the stator and the rotor are the closest. It corresponds moreover axially to the points of physical contact of the rotor and of the stator on rolling tracks. The poles located after this point of contact in the direction of the movement must repel the rotor while the poles located before it must attract the poles of the rotor. If the point of contact is between two poles of the stator, these poles are of the same polarity as the poles of the rotor are alternated and the forces must be of the opposite direction. When in the movement of the rotor the point of contact passes through the plane of symmetry of the first pole encountered in the movement the switching takes place, the current changes direction in this pole. The neighbouring poles retain their alternate polarity. The pole or poles diametrically opposite according to whether the number of poles is even or odd will have their power supply modified.

A first solution consists in individually powering each coil in the case of an even or odd number of poles at the stator.

Another solution in the case where the number of electromagnets at the stator is even consists in simultaneously powering all of the coils linked in series with a point of power supply located between each coil. The direction of winding is inverted between two neighbouring windings. The electromagnets can then be powered in such a way as to form along the closed pathway of the stator a succession of North poles and South poles on either side of the plane passing through the axis of the stator of the point of contact with a direct current power supply connected to the power supply points. Then, in order to rotate the rotor, it is provided to offset all of the electromagnets by one power supply point, thus forming a new succession of North poles and South poles symmetrically to a plane that has rotated. This operation is continuously renewed in order to rotate the rotor within the stator. The polarity inversion provokes a repelling of the pole of the rotor which is in the vicinity of a pole of the stator and an attraction of the following pole (in the direction of rotation of the rotor) of the rotor. Recall here that the concordance of the stator and rotor poles is guaranteed by the system of gears described hereinabove, together with the equality of the developed lengths of the stator and rotor poles such as described previously. It is this equality that makes the torque substantially constant with a direct current power supply.

In reference to FIGS. 10*a* to 10*c*, an example of an individual power supply of the poles is shown. In this case, the stator comprises nine poles A to I and the rotor eight poles J to Q. The three figures show three successive positions of the rotor in relation to the stator and the power supply of the coils of the poles of the corresponding stator. These three figures show the "passing" of the rotor on a pole of the stator (the pole A) according to a direction of rotation R but can be naturally transposed to all of the poles of the stator.

FIG. 10*a* therefore shows an arrangement of the rotor 6 and of the stator 1 such that the point of contact 100 between the rotor and the stator is located upstream of the pole A. All of the poles of the stator are then powered in such a way that the pole A is of South polarity and therefore attracting the pole J of the rotor of North polarity (N) and being located in the vicinity of the pole A. In order to polarise the pole A, the coil 3 was powered in a direction in such a way that the pole has a South polarity. The pole B is polarised inversely in such a way that it has a North polarity attracting as such the pole K of the rotor of South polarity. In the same way, the poles C and D of the stator are powered in such a way as to have respectively a South and Nord polarity making it possible to respectively attract the poles L and M of the rotor. The pole E of the rotor is not powered and therefore has no polarity. The following coils F to I are powered in such a way as to respectively repel the poles N to Q. All of the forces of attraction and repelling thus act in such a way as to accompany the rotation of the rotor 6 around the point of contact 100. FIG. 10*b* shows a following position of the rotor 6 in relation to stator 1 such that the point of contact 101 between the two is located on pole A. The coils of the poles B to D are powered in such a way as to attract the poles K to M of the stator. The coils of the poles E and F are powered in such a way as to respectively have a pole S and N in such a way that the pole N of the rotor is attracted by the pole E of the stator and repelled by the pole F of the stator. The coils of the poles G to I are powered in such a way as to repel the poles O to Q of the rotor. All of the forces of attraction and of repelling thus act in such a way as to accompany the rotation of the rotor 6 around the point of contact 101.

FIG. 10c shows a following situation wherein the point of contact 102 between the rotor 6 and the stator 1 is located between the coils A and B. The power supply of the coils of the poles of the stator is therefore the same as that in FIG. 10a but offset by one pole according to the direction opposite the direction of rotation R of the rotor 6.

In reference to FIGS. 11a to 11c, an example of an individual power supply of the poles is shown. The stator comprises nine poles A to I and Z and the rotor eight poles J to Q. The three figures show three successive positions of the rotor in relation to the stator and the power supply of the coils of the poles of the corresponding stator. These three figures show the "passing" of the rotor on a pole of the stator (the pole A) according to a direction of rotation R but can be naturally transposed to all of the poles of the stator.

FIG. 11a therefore shows an arrangement of the rotor 6 and of the stator 1 such that the point of contact 110 between the rotor and the stator is located upstream of the pole A. All of the poles of the stator are then powered in such a way that the pole A is of North polarity and therefore attracting the pole K of the rotor of South polarity (S) and being located in the vicinity of the pole A. In order to polarise the pole A, the coil 3 was powered in a direction in such a way that the pole has a North polarity. The pole B is polarised inversely in such a way that it has a South polarity as such attracting the pole L of the rotor of North polarity. In the same way, the poles C and D of the stator are powered in such a way as to respectively attract the poles M and N of the rotor. The pole E of the rotor is powered in such a way as to have a North pole in order to repel the pole N (of North polarity). The pole F of the rotor is powered in such a way as to have a North pole in order to attract the pole O (of South polarity). The coils of the poles G, H, I and Z are powered in such a way as to respectively repel the poles O, P, Q and J. All of the forces of attraction and of repelling as such act in such a way as to accompany the rotation of the rotor 6 around the point of contact 110. FIG. 11b shows a following position of the rotor 6 in relation to stator 1 such that the point of contact 111 between the two is located on pole A. The coils of the poles B to D are powered in such a way as to attract the poles L to N of the stator. The coils of the poles E and G are powered in such a way as to respectively have a North and South polarity. The coils of the poles H, I and Z are powered in such a way as to repel the poles P, Q and K of the rotor. The coils A and F being in "direct" contact with respectively the poles K and O of the rotor, its powering is inverted in direction in order to allow for the passing from a North to South polarity as such accompanying the movement of rotation of the rotor 6.

FIG. 11c shows a following situation wherein the point of contact 111 between the rotor 6 and the stator 1 is located between the coils A and B. The power supply of the coils of the poles of the stator is therefore the same as that in FIG. 11a but offset by one pole according to the direction opposite the direction of rotation R of the rotor 6.

FIG. 12 shows a possible embodiment of the invention in which the stator comprises an even number of poles. All of the poles are connected in series with point of power supply located between each coil. In relation to a winding such as is shown in FIGS. 11a to 11c, note that the direction of winding is inverted between two successive windings. The poles can then be powered in such a way as to form along the closed pathway of the stator a succession of North poles and South poles on either side of the plane passing through the axis of the stator of the nip line with a direct current power supply connected to the diametrically opposite power supply points 120 and 122. Note that the poles diametrically opposite whereon are connected the power supply points 120 and 122 are short-circuited at the same potential, deactivating as such any polarity of said poles. Then, in order to rotate the rotor, it is provided to offset by one pole the power supply as such forming a nouvelle succession of North poles and South poles symmetrically to a plane which has rotated. This operation is continuously renewed in order to rotate the rotor within the stator.

In reference to FIG. 8 and according to an advantageous embodiment of the invention, the rolling tracks 91 of the stator and the corresponding rolling tracks 92 of the rotor have on their respective rolling surfaces 912 and 922 homologous oblique portions 914 and 924 in such a way that the surfaces are substantially complementary.

These oblique portions can be carried out in the form of a bevelled slope or thanks to an appropriate curvature profile (hyperbolic, parabolic, etc.).

This oblique portion makes it possible to generate an axial reaction force making it possible to avoid the rotor from carrying out an axial displacement during its rotation.

An axial offset of the rotor increases by the slope of the rolling tracks the rotating diameter of a track of the rotor, its end of the side of the offset advances a little faster than the other the trajectory in thread pitch on the rolling tracks provokes a movement of the rotor in the direction opposite the initial offset. A very small oblique trajectory rapidly corrects the position of the rotor, the set of gears suffices to provide a sufficient angle of correction.

As such, such oblique portions provide a mechanical adjustment of the axial position of the rotor. This adjustment makes it possible in particular to avoid the application of axial loads on support members of the rotor able to result in time in wear and/or deteriorations.

In reference to FIGS. 9a and 9b, it can be seen diagrammatically that the stator includes an internal space of radius $r_s$ wherein is displaced a hollow rotor with inner radius $r_r$, (the thickness of the rotor here being neglected). It is then understood that the trajectory described by the rotor during its rotation is such that its inside space circumscribes a space of circular section 93 of radius $r_d$. This space is interesting in that it makes it possible to pass, in addition to the output shaft, elements that are internal or external to the motor such as cables, etc. without these elements being subject to the movements of the rotor, which circulates around this space.

In order to guarantee this space 93, the ratio of the radii of the stator and of the rotor must therefore be chosen under the following constraints:

$$1 < \frac{r_s}{r_r} < 2$$

Of course the ratio must be greater than 1 in order for the rotor to be able to be inserted into the hollow of the stator. In addition the ratio that links the three radii is as follows:

$$r_d = 2r_r - r_s$$

This ratio is however simplified because in reality, the rotor has a certain thickness and is therefore characterised by an inner radius $r_{ri}$ and an outer radius $r_{re}$, with the space then defined by the trajectory of the internal surface of the rotor. In reference to FIG. 9b, note that the space defined as such makes it possible to arrange a cylinder such as that used for the output shaft of the motor. This cylinder can be hollow making it possible to pass elements inside such as explained hereinabove. The ratios then become:

$$\frac{r_s}{r_{ri} + r_{re}} < 1 \text{ and } r_d = r_{ri} + r_{re} - r_s$$

The values of the inner radius $r_s$ of the stator and of the inner and outer radii $r_{ri}$ and $r_{re}$ of the rotor are in this case chosen according to the radius $r_d$ sought for this space 93.

FIG. 9b also shows the particular case wherein the output shaft 94 has a radius substantially equal to $r_d$ and wherein this shaft is hollow, as such making it possible to pass elements inside as explained hereinabove.

However, in the hypothesis wherein the developed lengths of the rotor poles and of the stator poles are equal, then the number of stator poles and the number of rotor poles are substantially proportional to the inner radius of the stator and to the outer radius of the rotor, and such formulas can be applied to the relationship between the number of poles of the stator ns and the number of poles of the rotor nr:

$$\frac{ns}{nr} < 2$$

Of course, this invention is not in any way limited to the embodiment described hereinabove and shown in the drawings, and those skilled in the art can make many alternatives and modifications.

Note that an embodiment of the invention in the form of an electric motor has in general been described, however those skilled in the art will be able to apply the characteristics described to any other rotary machine (for example to a generator).

The invention claimed is:

1. A rotary electric machine comprising:
    a stator and an eccentric rotor, the stator comprising a plurality of magnetic poles distributed circumferentially in order to define a closed cylindrical space, the eccentric rotor having a substantially cylindrical shape with a diameter less than that of said closed cylindrical space and comprising a plurality of magnetic poles distributed circumferentially, the eccentric rotor being rotatable inside the closed space, the number of poles of the stator being superior to the number of poles of the eccentric rotor; and
    a shaft rotatably coupled to the eccentric rotor, wherein on the area of electromagnetic interaction between the stator and the eccentric rotor, an evolute of a stator pole and an evolute of a rotor pole are of substantially equal lengths.

2. The rotating electric machine according to claim 1, wherein the stator comprises at least one rolling track adapted to roll, the at least one rolling track having a complementary profile able to create an axial counter-reaction force.

3. The rotating electric machine according to claim 1, wherein the magnetic poles of the stator include windings, and a controller is adapted to control power supply to the windings according to position information of the eccentric rotor.

4. The rotating electric machine according to claim 3, wherein said position information of the eccentric rotor is provided by an angular sensor.

5. The rotating electric machine according to of claim 1, further comprising a device for meshing between eccentric rotor and the stator in order to guarantee a non-slip rotation of the eccentric rotor in the stator.

6. The rotating electric machine according to claim 1, wherein the shaft is connected to the eccentric rotor by a drive pin transmission system including drive pins cooperating with holes of a size greater than the drive pins.

7. The rotating electric machine according to claim 6, wherein said holes each include a mechanical bearing.

8. The rotating electric machine according to claim 7, wherein each drive pin comprises an adherence surface comprising a joint on a bearing surface, wherein the corresponding mechanical bearing bears against the bearing surface.

9. The rotating electric machine according to claim 1, wherein the shaft is connected to the eccentric rotor by a twin-gear transmission system.

10. The rotating electric machine according to claim 1, further comprising a counterweight forming with the eccentric rotor a unit, the unit having a center of gravity located in a vicinity of an axis of the stator.

11. The rotating electric machine according to claim 10, wherein the counterweight has a substantially moon crescent shape.

12. The rotary electric machine according to claim 1, wherein the stator has an even number of magnetic poles, each magnetic pole of the stator having windings, wherein a direction of the windings of the stator are inverted between two adjacent magnetic poles, and wherein the windings of the stator are all connected in series.

* * * * *